(12) United States Patent
Iles et al.

(10) Patent No.: US 8,558,512 B2
(45) Date of Patent: Oct. 15, 2013

(54) SMART BATTERY CHARGING SYSTEM FOR ELECTRICAL GENERATOR

(75) Inventors: Robert Iles, Delafield, WI (US); Alan Dietrich, Madison, WI (US); Steven Wilcox, Delafield, WI (US); Greg Wischstadt, Wales, WI (US); David Thimmesch, Franklin, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 364 days.

(21) Appl. No.: 13/008,420

(22) Filed: Jan. 18, 2011

(65) Prior Publication Data

US 2011/0291621 A1    Dec. 1, 2011

Related U.S. Application Data

(60) Provisional application No. 61/295,970, filed on Jan. 18, 2010.

(51) Int. Cl.
  *H02J 7/04* (2006.01)
  *B60W 20/00* (2006.01)
(52) U.S. Cl.
  USPC ........... 320/145; 320/148; 320/150; 320/155; 320/162; 180/65.1; 180/65.21; 180/65.29

(58) Field of Classification Search
  USPC ........................................... 320/145
  See application file for complete search history.

(56) References Cited

U.S. PATENT DOCUMENTS

| 5,602,459 | A | 2/1997 | Rogers |
| 6,034,507 | A * | 3/2000 | Ikawa et al. ................ 320/136 |
| RE37,678 | E * | 4/2002 | Ikawa et al. ................ 320/136 |
| 6,515,456 | B1 | 2/2003 | Mixon |
| 6,809,428 | B1 | 10/2004 | Blackburn et al. |
| 6,943,531 | B2 * | 9/2005 | Fukaya ........................ 322/10 |
| 6,986,398 | B2 * | 1/2006 | Obayashi ................ 180/65.28 |
| 2002/0008496 | A1 * | 1/2002 | Shamoto et al. ............ 320/116 |
| 2003/0222624 | A1 * | 12/2003 | Votoupal ..................... 320/150 |
| 2004/0008009 | A1 * | 1/2004 | Fukaya ........................ 322/44 |
| 2004/0169489 | A1 * | 9/2004 | Hobbs ......................... 320/104 |
| 2005/0162135 | A1 | 7/2005 | Browning et al. |
| 2005/0282065 | A1 * | 12/2005 | Kubo .......................... 429/62 |
| 2009/0229288 | A1 | 9/2009 | Alston et al. |

* cited by examiner

*Primary Examiner* — Yalkew Fantu
(74) *Attorney, Agent, or Firm* — Boyle Fredrickson, S.C.

(57) ABSTRACT

An electrical generator has an engine that provides a mechanical output that is converted to electrical current by an alternator. The engine is started by a battery-powered motor starter. The battery is charged during running of the electrical generator by a portion of the electrical current output by the alternator. The battery is charged according to a charging profile based on the temperature of the battery at start up of the electrical generator.

20 Claims, 7 Drawing Sheets

SMART BATTERY CHARGING SYSTEM FOR ELECTRICAL GENERATOR

CROSS-REFERENCE TO RELATED APPLICATION

This application claims the benefit of U.S. Ser. No. 61/295,970, filed Jan. 18, 2010, the disclosure of which is incorporated herein by reference.

BACKGROUND AND SUMMARY OF THE INVENTION

Electrical generators are used in a wide variety of applications. Typically, an electrical generator operates in a stand-by mode wherein the electrical power provided by a utility is monitored such that if the commercial electrical power from the utility fails or is otherwise interrupted for a certain period of time, the engine of the electrical generator is started, either automatically or manually by a customer, causing the generator to supply emergency or backup electrical power. More particularly, the engine drives an alternator to provide electrical current to power selected electrical loads that are connected to the electrical generator, which is typically through a dedicated electrical panel, i.e., transfer panel.

When the electrical power generated by the alternator reaches a predetermined voltage and frequency desired by the customer, a transfer switch transfers the load imposed by the customer from the commercial power lines to the electrical generator. The electrical generator then supplies electrical power to selected loads, which are typically deemed to be critical loads, such as HVAC equipment, refrigerator(s), lighting, and, if applicable, medical equipment.

Larger electrical generators, which are typically used to provide backup or standby electrical power to larger dwellings, commercial and retail spaces, offices, and hospitals and medical facilities, are generally started by means of a battery-powered starter motor. Typically, the starter battery is kept charged with a charging current developed by the generator as the generator operates. Over time however the maximum charge of the battery will decline until ultimately the battery lacks the charge to energize the starter motor and the electrical generator will be unable to supply backup electrical power.

In a conventional arrangement, the battery is charged simply as a function of the electrical output of the alternator and therefore when the alternator is operating at or near full capacity, a maximum charging current is supplied to the battery regardless of the current charge of the battery. In other words, in most instances, the charging current fed through the battery is independent of the actual charge remaining of the battery. As a result, it is possible for a fully charged battery to still be exposed to a charging current, which can ultimately damage the battery.

For instance, once a battery is fully charged, the charging current has to be dissipated somehow. The result is the generation of heat and gases both of which are bad for the battery. Therefore, it is recognized that to effectively charge a battery it is ideal to detect when the reconstitution of the active battery chemicals is complete and to then terminate the charging process before any damage is done to the battery. One approach is to detect when a predetermined upper voltage limit, often called the termination voltage, has been reached and responsive thereto, switchably disconnect the battery from the charging source, i.e., alternator.

Switchably disconnecting the battery from the alternator has some drawbacks. For example, electronics of the electrical generator will deplete the battery, which may therefore require continuous cycling of the connection of the battery to the alternator. Also, if a fast charge is used when the battery is connected to the alternator, it is possible for more electrical current to be pumped through the battery faster than the chemical processes within the battery can react to the current. On the other hand, if a trickle or slow charge is used, there may not be enough current to fully charge the battery.

The present invention is directed to a battery charging system for charging the battery of an electrical generator and doing so in a manner that extends battery life and maintenance intervals by only applying the amount of charge necessary to maintain a full charge during a charging interval for the battery. Depending upon the charge of the battery, the charge applied to bring the battery to a full charge may be applied in a boost (fast) charge or in a trickle charge.

In one embodiment, the present invention is embodied in executable code that is executed by the general controller of the generator, and in a preferred embodiment, the controller controls charging of the battery but also provides general battery monitoring. In a further preferred embodiment, the circuitry that controls operation of the generator's engine and alternator also controls operation of the battery charging system.

It is therefore an object of the invention to provide a battery charging system for use with an electrical generator that provides dynamic charging of the battery to avoid overcharging of the battery.

It is another object of the invention to provide a system for charging the battery of an electrical generator that selectively applies a fast charge or a trickle charge depending on various real-time characteristics of the battery.

It is a further object of the invention to provide an electrical generator having a battery powered motor starter and a battery charging circuit for charging the battery during operation of the electrical generator, and that charges the battery based on various operational characteristics of the battery, such as voltage level of the battery and battery temperature.

It is yet another object of the present invention to provide a controller for a battery charging circuit of an electrical generator and to power the controller from electrical power generated during operation of the electrical generator.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

The drawings illustrate the best mode presently contemplated of carrying out the invention.

In the drawings.

DETAILED DESCRIPTION

Figure 1:
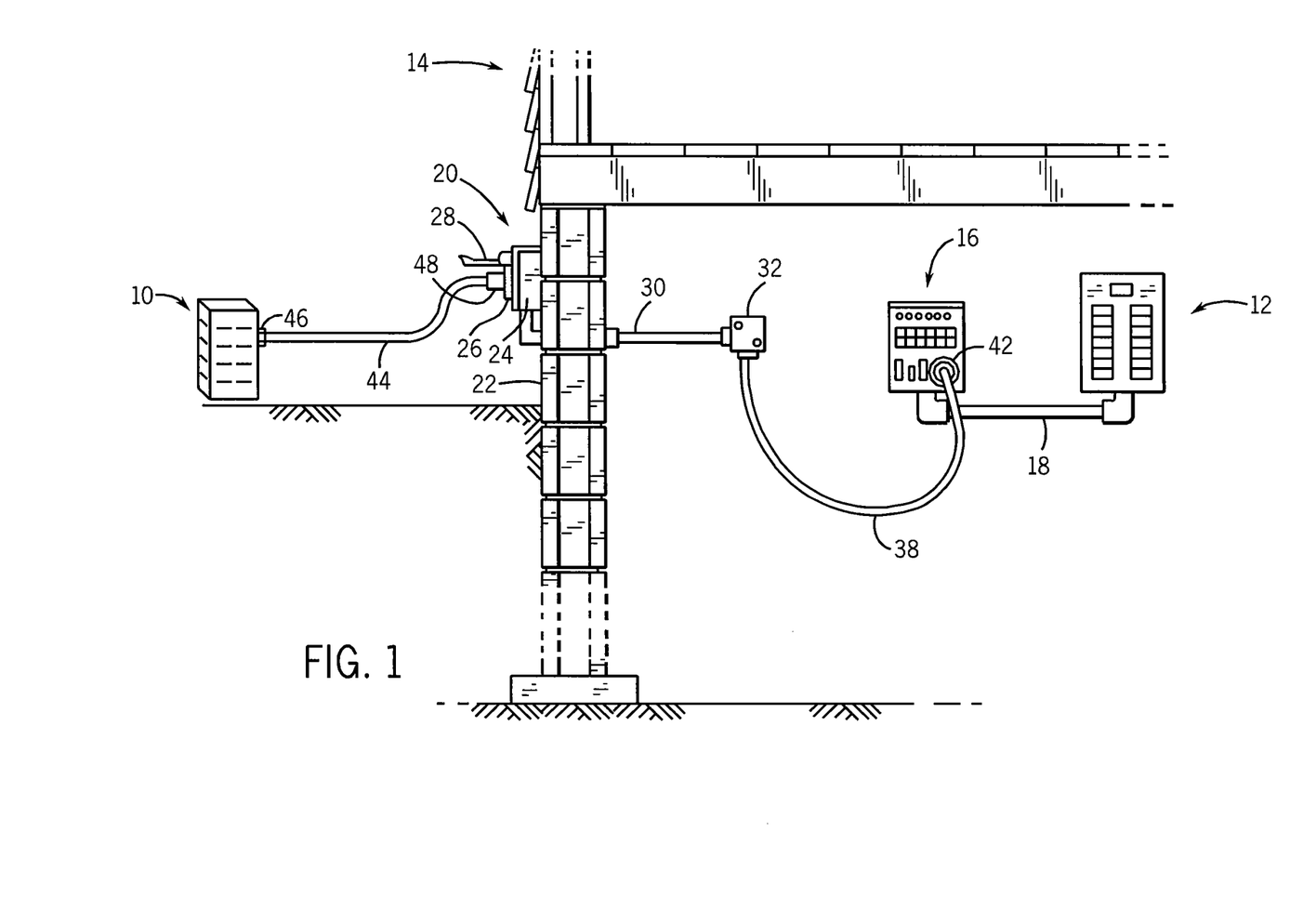
FIG. 1 is a schematic representation of a standby or emergency power supply system that supplies electrical power to an electrical system during interruption of utility power.

FIG. 1 shows a power inlet arrangement for interconnecting a generator 10 with a main electrical panel or load center 12 located in the interior of a building 14. In the power inlet arrangement of FIG. 1, a power transfer panel 16 is mounted adjacent main panel 12, and is interconnected therewith via a series of wires enclosed by a conduit 18 extending between main panel 12 and transfer panel 16.

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with receptacle 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage.

In a preferred embodiment, the electrical generator is caused to run automatically upon the interruption of utility power. In this regard, a customer is not required to manually start the electrical generator to commence the supply of standby electrical power. As known in the art, when utility power is interrupted, the transfer panel transmits a signal to the electrical generator which causes the electrical generator to start. Thus, as known in the art, some utility power is fed to the generator when utility power is providing electrical power to the electrical system of the building and is used to power electronics of the generator when the generator is not running.

Figure 2:
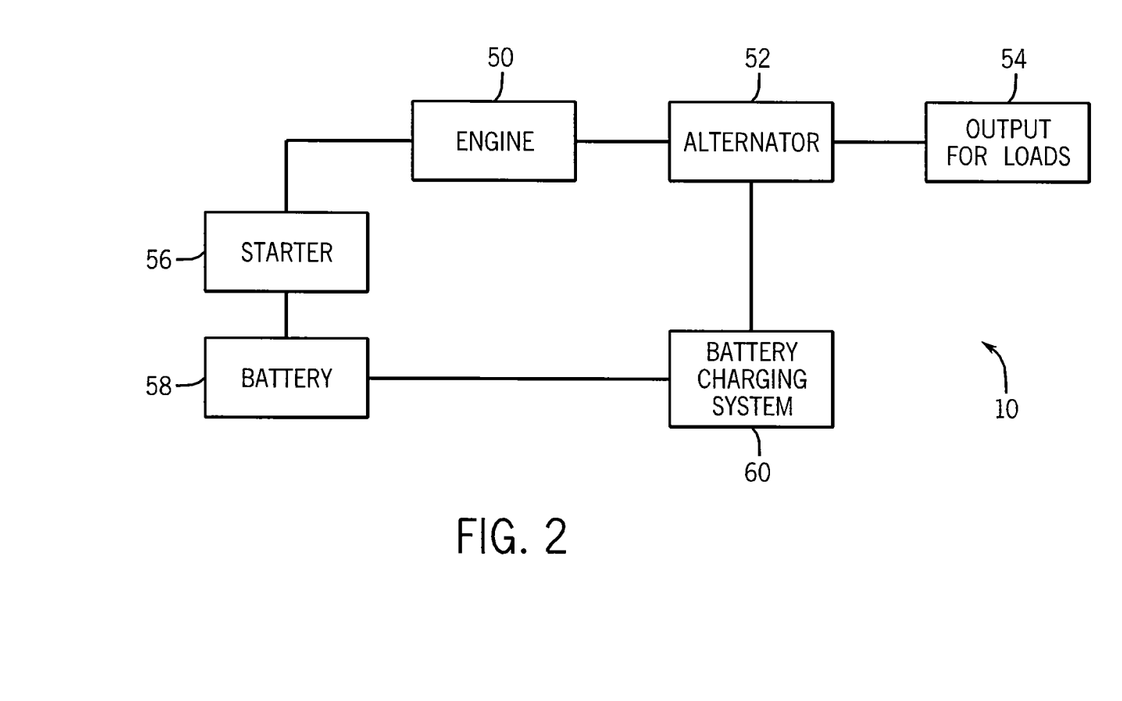
FIG. 2 is a partial schematic representation of an electrical generator according to one embodiment of the invention.

With reference now to FIG. 2, the electrical generator 10 generally consists of an internal combustion engine 50 that when running drives an alternator 52 to produce electrical current that is supplied to output 54, which is electrically coupled to an electrical load through transfer panel 16. A motor starter 56 is energized by a battery 58 to initiate operation of the engine 50 as known in the art. A portion of the electrical current generated by the alternator 52 is supplied to the battery 58 to charge the battery 58, as will be described more fully below. It is understood that the generator 10 may include additional components or systems as known in the art, such as an engine cooling system, an exhaust system, and the like. An exemplary electrical generator is shown and described in U.S. patent application Ser. No. 13/008,655, the disclosure of which is incorporated herein.

In accordance with one embodiment of the invention, the electrical generator further has a battery charging system 60 that controls the supply of charging current to the battery 58. With additional reference to FIG. 3, the battery charging system 60 includes a battery voltage sense circuit 62, a battery charge current sensor 64, and an ambient temperature sensor 66 that measure battery voltage, battery charge current, and ambient temperature, respectively. The charging system 60 further has an electrolyte temperature sensor 68 and a battery weight sensor 70. Each of these sensors provides information to a system controller 72, which determines a voltage for a charging current as a function of battery temperature.

Figure 4:
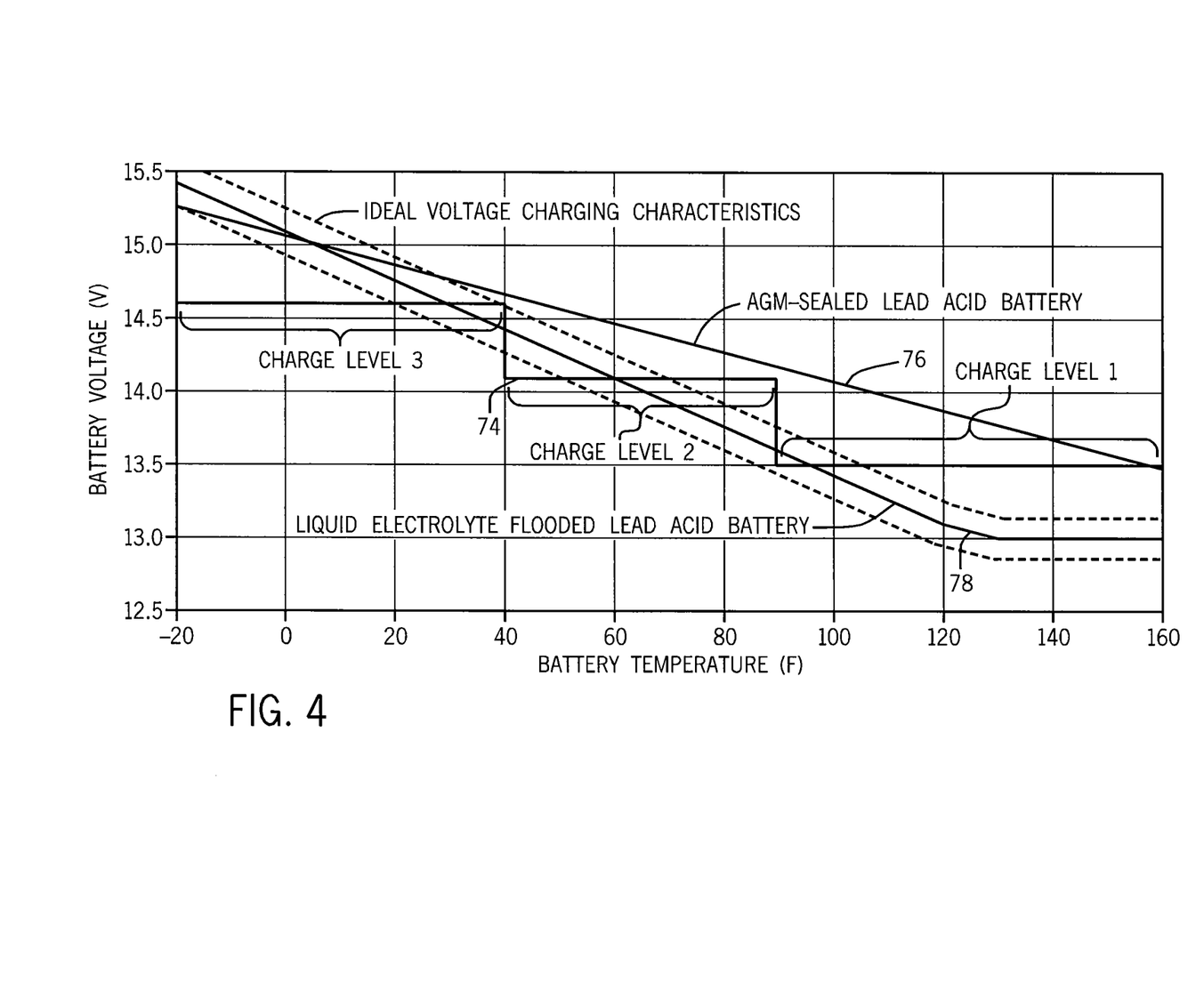
FIG. 4 is a graph showing battery charging voltage as a function of battery temperature.

FIG. 4 is a chart showing an exemplary charging system ("charger") output voltage profile 74 as a function of battery temperature for a representative Sealed Lead Acid Battery 76 and a representative Flooded Lead Acid Battery 78. The exemplary charger output voltage profile 74 is a stepped profile in which the output voltage is decreased in steps as battery temperature increases. It will be appreciated however that other charger output voltage profiles are possible and considered within the scope of the invention.

Figure 3:
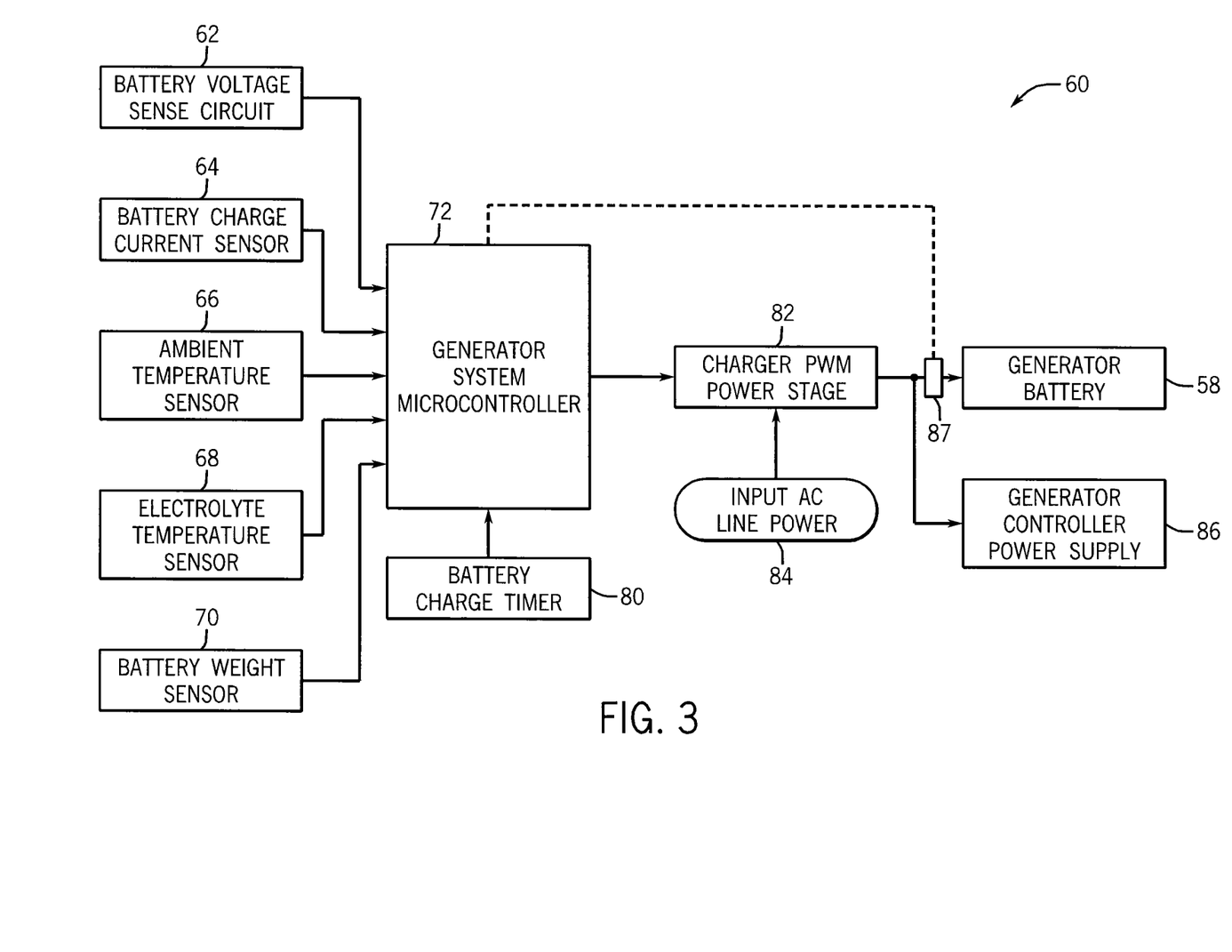
FIG. 3 is a schematic representation of a battery charging system of the electrical generator of FIG. 2.

Referring again to FIG. 3, the battery charging system 60 further includes a battery charge timer 80 that is used to determine if the battery requires inspection as will be described with respect to FIG. 6, and a high switching frequency pulse-width-modulated (PWM) power stage 82, which is provided AC power via input terminal 84. When the generator is running, the input terminal 84 receives electrical power from the alternator. When the generator is not running, the input terminal 84 receives electrical power from the utility power being provided to the generator. It will be appreciated that a known switch may be used to selectively connect the input terminal 84 to the alternator or the utility power. Alternately, the power stage 82 may have two input terminals with one connected to receive the utility power and one connected to receive electrical power from the alternator. In either instance, the power stage 82 takes the received AC power and develops a regulated charging voltage and charging current to be input to the battery 58. The high switching frequency significantly reduces the size of the charging components and allows them to be mounted inside the enclosure (not shown) for the controller 72. When the controller 72 determines that the battery 58 requires charging, the controller 72 compares the battery voltage to a threshold that dictates whether the battery is heavily or lightly drained. In one embodiment, the threshold voltage is 5.0V. If the battery voltage is below the threshold, and is thus heavily drained, charging current and voltage is provided during a fast charge. On the other hand, if the battery voltage is above the threshold, the battery is deemed to be lightly drained, and a trickle charge is used to charge the battery. As shown in FIG. 3, a portion of the output of the power stage 82 is used to provide electrical power to a generator controller power supply 86. Further, the charging circuit 60 includes a switch, such as a relay 87, which is used to electrically connect the battery 58 to the power stage 82.

Figure 5A:
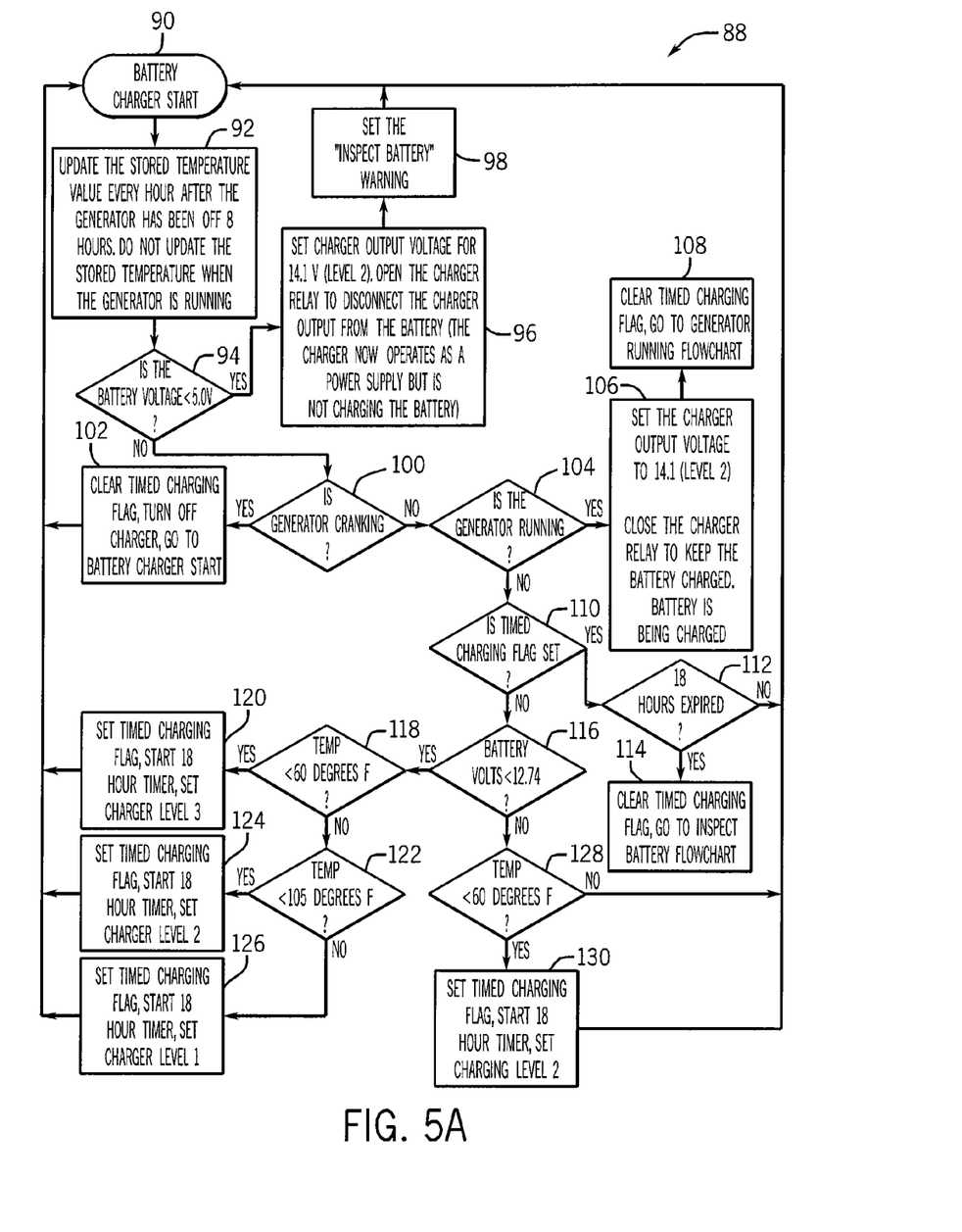
FIGS. 5A and 5B set forth the steps of a battery charging process carried out by the battery charging system of FIG. 3.
Figure 5B:
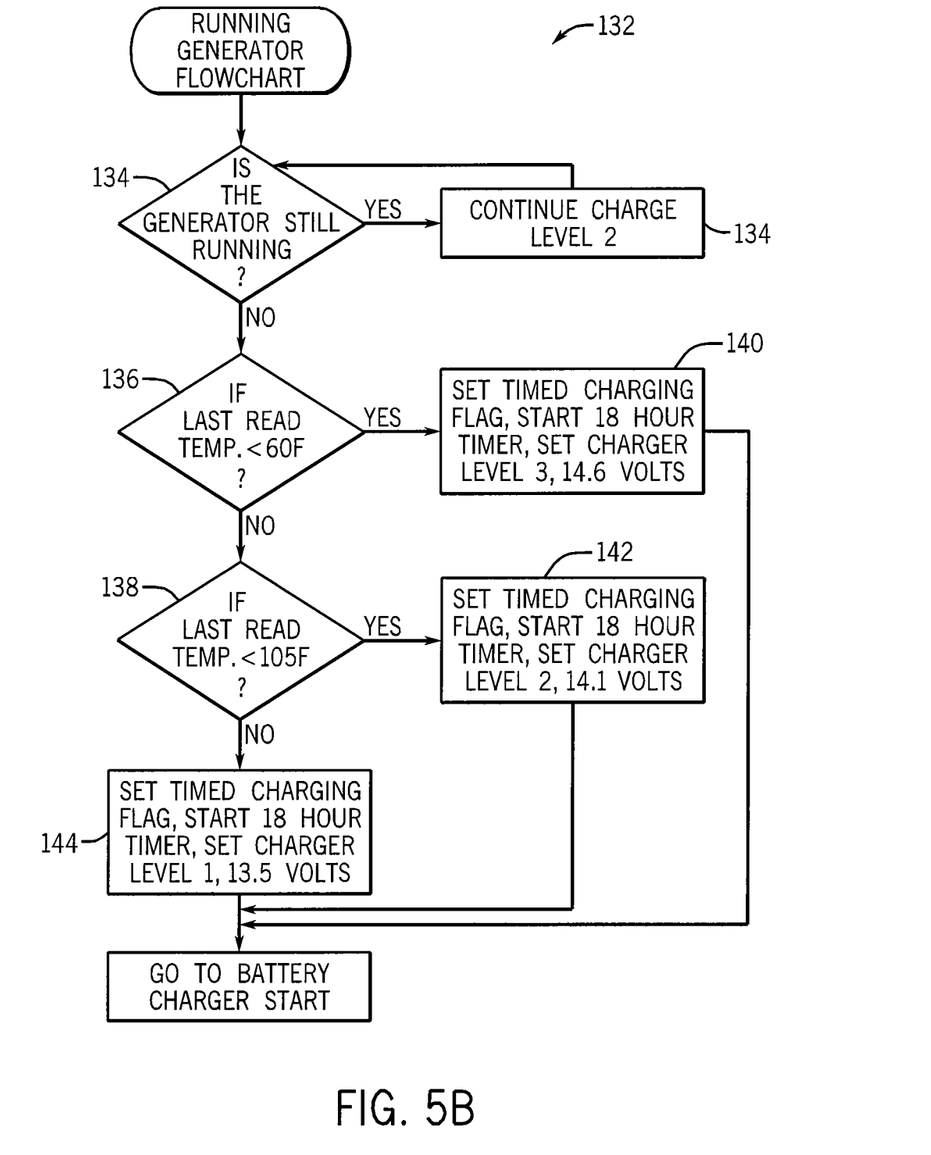

Referring now to FIGS. 5A and 5B, the present invention further includes a process 88 carried out by the system controller 72 for charging the battery 58 of the electrical generator 10. The process 88 is initiated at startup of the electrical generator at block 90, whereupon the controller reads the output of the battery temperature sensor 68 at block 92. In a preferred embodiment, the temperature is only read if the generator has been off (not running) for more than eight hours. Moreover, preferably, the controller updates the stored battery temperature value at predefined intervals, e.g., top of every hour, after the generator has been off for more than eight hours. If the generator has been running in the previous eight hours, the previous temperature reading can be/is used. Also, preferably, the battery temperature is not read when the generator is running.

After acquiring the battery temperature information, the controller then reads the output of the battery voltage sense circuit 62 and compares the voltage level to a first threshold at block 94. If the voltage level is below the first threshold, e.g., 5.0 volts, the controller disconnects the relay from the battery so that a charging current is not supplied to the battery. Thus, in this condition, an attempt is not made to charge the battery but the power stage or charger is caused to provide power to the controller so that the controller continues to function even when the charge of the battery is below the threshold and thus insufficient to maintain the needed power to the controller. Also, if the battery voltage is below the threshold level, the controller will illuminate a warning lamp and/or sound an alarm at block 98 alerting an operator that the battery requires inspection. It will therefore be appreciated that from the aforedescribed steps of the process the battery is not charged if the battery voltage at generator startup is less than the threshold voltage, e.g., 5.0V.

If the battery voltage is greater than the threshold voltage at block 94, the controller then determines if the generator is cranking at block 100. If so, the controller turns off the power stage ("charger") at block 102 and then returns to block 90. It will thus be appreciated that a charging current is not supplied to the battery while the generator is cranking.

If the generator is not cranking at block 100, the controller then determines if the generator is running at block 104. If so, the controller sets the charge level of the power stage to Charge Level 2 of the Charge Profile 74 and closes the charger relay 87 at block 106. This results in a charging current being supplied to the battery 58 and the process proceeds to a generator running subroutine at block 108. The generator running subroutine is shown at FIG. 5B and will be described more fully below.

If the generator is not running at block 104, utility power will be used, if needed, to charge the battery. In this regard, if the generator is not running at block 104, the controller then determines if a timed charging flag is set at block 110. The charging flag is a digital indicator in memory of the controller that is set when the timer has been activated. If the charging flag is set, the controller then determines if the timer has expired at block 112. As noted above, the timer represents a maximum charging time and in one embodiment has a maximum value of 18 hours. If the timer has not expired, the process loops back to block 90. If the timer has expired, the charging flag is cleared, and the controller initiates an inspect battery subroutine at block 114. This subroutine is shown at FIG. 6 and will be described more fully below.

If the charging flag has not been set at block 110, the controller again reads the voltage of the battery and determines if it is below another threshold value, e.g., 12.74V, at block 116. If so, the controller then determines if the temperature of the battery is above or below a preset temperature, e.g., 60° F., at block 118. If the battery temperature is below the threshold, the controller sets the charging flag, starts the timer, and sets the charging level at Charge Level 3 of the Charging Profile 74 at block 120. Thereafter, the process returns to block 90. Thus, it will be appreciated that if the battery voltage is below 12.74V, for example, and the battery temperature is below 60° F., for example, the battery will be charged of utility power according to Charge Level 3 of the Charging Profile.

If the battery voltage is below the threshold at block 116 but the battery temperature is above the temperature threshold at block 118, the controller then determines if the battery temperature is below a higher temperature threshold, e.g., 105° F., at block 122. If the battery temperature is below this higher threshold, the battery is charged according to Charge Level 2 of the Charging Profile 74 at block 124. If the battery temperature is above this higher threshold, the controller will have the power stage charge the battery off of utility power according to Charge Level 1 of the Charging Profile at block 126. After the appropriate charging level has been set, the process returns to block 90.

If the battery voltage is above the elevated threshold at block 116, the controller determines if the battery temperature is above or below the threshold temperature at block 128. While not required, in a preferred embodiment, the threshold temperature to which the battery temperature is compared at block 128 is the same as the threshold temperature that is used at block 118 –60° F. If the battery temperature is above the threshold temperature, the controller returns to block 90 of the process. Thus, if the battery voltage is above 12.74V, for example, and the battery temperature is above 60° F., for example, the battery is not charged. If the battery voltage is above the voltage threshold, e.g., 12.74V, and the battery temperature is below the temperature threshold, e.g., 60° F., the controller sets the output of the power stage to charge the battery off of utility power at Charge Level 2 of the Charging Profile 74 at block 130, whereupon the controller returns to block 90 of the process.

Turning now to FIG. 5B, if the generator is, the processor executes a separate subroutine for charging of the generator battery. In this subroutine or process 132, the controller iteratively determines if the generator is running at block 134, and as long as the generator is running, the power stage provides a charging current at Charge Level 2 of the Charging Profile at block 134. This charging current is developed from the output of the alternator. However, once the generator stops running, the controller compares the battery temperate to the aforementioned battery thresholds at blocks 136 and 138. In a preferred embodiment, the battery temperatures are read from the temperature sensor before the engine/generator starts running. As such, the temperature read at block 92 of FIG. 5A. If the battery temperature is below the first temperature threshold, e.g., 60° F., the charging flag is set, the charging timer is started, and the power stage is caused to develop a charging current from the restored utility power and provide the charging current to the battery at Charge Level 3 of the Charging Profile 74 at block 140. If the battery temperature is greater than the first temperature threshold but less than the second threshold temperature, e.g., 105° F., the charging flag is set, the charging timer is started, and the power stage is caused to develop a charging current from the restored utility power and provide the charging current to the battery at Charge Level 2 of the Charging Profile 74 at block 142. If the battery temperature is above the second temperature threshold, the charging flag is set, the charging timer is started, and the power stage develops a charging current from the restored utility power and provides the charging current at Charge Level 1 of the Charging Profile 74 at block 144. Following action blocks 140, 142, and 144, the controller returns to block 90 of FIG. 5A.

Figure 6:
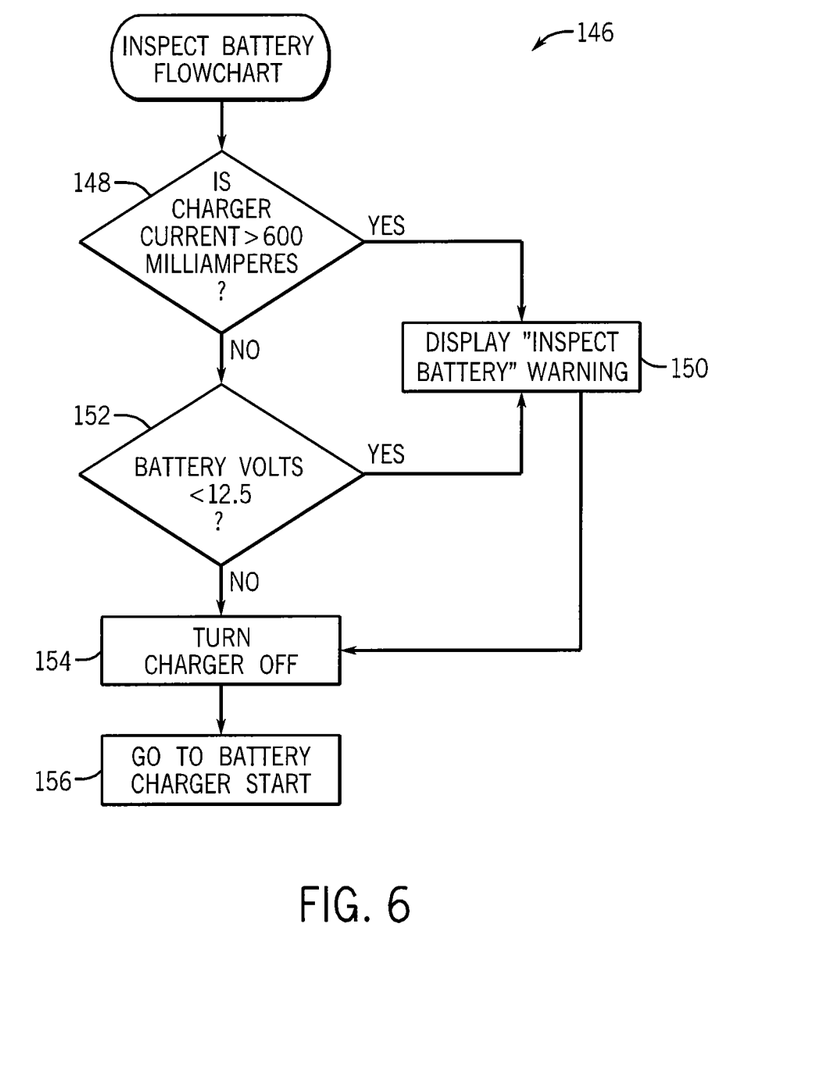
FIG. 6 is a flow chart setting forth the steps of a process for determining if the battery of the electrical generator requires inspection.

Referring now to FIG. 6, the controller, as noted above, also executes a routine or process 146 that determines if the battery has been sufficiently charged following a charging cycle. Process 146 is initiated at block 114, FIG. 5A, if the timer has expired. In such an instance, the controller determines if the charge current of the power stage is greater than an amperage threshold, e.g., 600 mA, at block 148. If so, the controller displays a suitable warning and/or sounds an alarm at block 150 signaling that the battery was not appropriately charged during the predefined time period thereby prompting a user that the battery requires inspection and possible replacement. On the other hand, if the output current of the power stage is less than the threshold, the controller then determines if the voltage of the battery is below a voltage threshold, e.g., 12.5V, at block 152. If the voltage is below the threshold thereby indicating that the battery is not charging, the controller goes to block 150 and activates the warning described above. However, if the voltage of the battery is above the threshold, the power stage is disabled at block to prevent further charging of the battery. The controller then returns to the beginning of the battery charging process at block 156. It will therefore be appreciated that after the battery has been supplied charging current for the maximum charge time, e.g., 18 hours, the controller determines if the battery is charged. If it is not, a suitable warning is activated signaling that the battery is not charging properly.

It will be appreciated that the present invention provides a method and apparatus for supplying charging current to a battery of an electrical generator. Using information regarding the status of the battery, such as battery temperature and voltage level, the present invention selects a charging profile according to which charging current is provided to the battery. It is believed that using temperature as a factor in determining how to charge the battery will extend the life of the battery and expedite the time needed to charge the battery. Additionally, the invention includes a method for determining the health of the battery after charging.

Many changes and modifications could be made to the invention without departing from the spirit thereof. The scope of these changes will become apparent from the appended claims.

The invention claimed is:

1. An electrical generator for supplying electrical power to a load connected to the electrical generator, comprising:
   an engine that provides a mechanical output;
   a power unit that converts the mechanical output to an electric current;
   a battery that supplies power for starting of the engine, and configured to be charged by some of the electric current provided by the power unit; and
   a controller that acquires data regarding a temperature of the battery and from the data controls the power unit to supply a charging current to the battery at a voltage that is dependent upon the temperature of the battery.

2. The electrical generator of claim 1 wherein the controller determines a health of the battery and provides a human discernable indicator regarding the health of the battery.

3. The electrical generator of claim 2 wherein the controller determines the health of the battery by comparing battery charge current during a battery charging profile to a predetermined charge current level.

4. The electrical generator of claim 1 wherein the controller controls charging of the battery according to a boost charge if the battery is heavily depleted of charge and according to a trickle charge if the battery is lightly depleted of charge.

5. The electrical generator of claim 1 wherein the controller further causes the power unit to not supply a charging current to the battery if the voltage of the battery exceeds a voltage threshold and the temperature of the battery at start up of the electrical generator exceeds a temperature threshold.

6. The electrical generator of claim 5 wherein the voltage threshold is approximately 12.74V and the temperature threshold is 60° F.

7. The electrical generator of claim 1 wherein the controller further causes the power unit to supply charging current to the battery according at a default voltage that is independent of battery temperature when the electrical generator is running, and causes the power unit to supply charging current to the battery at a voltage based at least in part on the temperature of the battery when the electrical generator is not running but electrically coupled to a utility power supply.

8. The electrical generator of claim 1 wherein the controller determines a desired voltage level for the charging current from a charging profile stored in computer readable memory accessible by the controller.

9. The electrical generator of claim 8 wherein the controller causes the power unit to supply charging current at a voltage level of approximately 14.6V if the temperature of the battery is between −20° F. and 40° F., supply charging current at a voltage level of approximately 14.1V if the temperature of the battery is between 40° F. and 90° F., and supply charging current at a voltage level of 13.5V if the temperature of the battery is greater than 90° F.

10. An electrical generator for supplying electrical power to a load connected to the electrical generator, comprising:
    an engine that provides a mechanical output;
    an alternator that converts the mechanical output to electrical current;
    a motor starter for starting the engine;
    a battery that energies the motor starter for initiating operation of the engine; and
    a battery charging system that supplies charging current to the battery at a voltage level selected from a charging profile based at least on a temperature of the battery at start up of the electrical generator.

11. The electrical generator of claim 10 further comprising a sensor that measures the temperature of the battery and a voltage sensor that measures a voltage level of the battery, and wherein the battery charging system further including a controller that sets an output of the battery charging system based on the temperature of the battery at start up of the electrical generator and a voltage of the battery at start up of the electrical generator.

12. The electrical generator of claim 11 wherein the charging profile identifies three different voltage levels at which the charging current may be used to charge the battery.

13. The electrical generator of claim 12 wherein the three voltages are approximately 14.6V if the temperature of the battery is between −20° F. and 40° F., approximately 14.1V if the temperature of the battery is between 40° F. and 90° F., and approximately 13.5V if the temperature of the battery is greater than 90° F.

14. The electrical generator of claim 11 wherein the controller is configured to execute a battery health diagnostic process after the battery is charged.

15. The electrical generator of claim 14 wherein the controller activates a warning that the battery did not charge properly if the voltage of the battery after a charging cycle is less than 12.5V.

16. The electrical generator of claim 11 wherein the controller sets a maximum charging time independent of a voltage level of the battery.

17. An electrical generator that supplies electrical power to an electrical system, comprising:
    an engine that provides a mechanical output;
    an alternator that converts the mechanical output to electrical current;
    a motor starter for starting the engine;
    a battery that energies the motor starter for initiating operation of the engine; and a battery charger interconnected between the battery and the alternator, the battery charger configured to supply charging current to the battery at a selected one of a number of voltage levels set by a charging profile.

18. The electrical generator of claim 17 wherein the battery charger includes a pulse width modulated power block.

19. The electrical generator of claim 17 further comprising a battery temperature sensor that measures a temperature of the battery, and wherein the selected one of the number of voltage levels is selected based on the temperature of the battery at start up of the electrical generator.

20. The electrical generator of claim 17 further comprising a controller that controls operation of the battery charger to provide the charging current to the battery, and wherein the battery charger provides electrical power to the controller for powering operation of the controller.

* * * * *